United States Patent
Yang

(10) Patent No.: US 8,213,175 B2
(45) Date of Patent: Jul. 3, 2012

(54) ELECTRONIC DEVICE HAVING IMPROVED INPUT DEVICE

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 340 days.

(21) Appl. No.: 12/504,676

(22) Filed: Jul. 17, 2009

(65) Prior Publication Data

US 2010/0238640 A1    Sep. 23, 2010

(30) Foreign Application Priority Data

Mar. 20, 2009   (CN) .......................... 2009 1 0301005

(51) Int. Cl.
*H05K 5/00* (2006.01)
*H05K 7/00* (2006.01)
*H05K 7/02* (2006.01)

(52) U.S. Cl. ................ 361/679.4; 361/679.01; 361/755; 361/811

(58) Field of Classification Search ................. 361/811, 361/679.1, 679.4, 679.01, 679.06, 679.18, 361/752, 755, 803, 808; 338/47, 73, 162; 455/575.1

See application file for complete search history.

(56) References Cited

U.S. PATENT DOCUMENTS

| | | | |
|---|---|---|---|
| 2,993,184 A * | 7/1961 | Mims et al. | 338/174 |
| 3,725,772 A * | 4/1973 | Ratzel | 323/213 |
| 6,275,140 B1 * | 8/2001 | Asano | 338/162 |
| 6,794,982 B2 * | 9/2004 | Inoue et al. | 338/47 |
| 7,369,033 B2 * | 5/2008 | Matsukawa et al. | 338/162 |
| 2004/0080395 A1 * | 4/2004 | Okada et al. | 338/47 |
| 2004/0253931 A1 * | 12/2004 | Bonnelykke et al. | 455/90.3 |
| 2007/0087263 A1 * | 4/2007 | Ge et al. | 429/97 |
| 2007/0095644 A1 * | 5/2007 | Akieda et al. | 200/531 |
| 2007/0110392 A1 * | 5/2007 | Miwa | 386/83 |

* cited by examiner

*Primary Examiner* — Timothy Thompson
*Assistant Examiner* — Sherman Ng
(74) *Attorney, Agent, or Firm* — Altis Law Group, Inc.

(57) ABSTRACT

An electronic device includes a body and an input device. The body includes a shell and a non-conductive rear cover. The shell defines an opening. The rear cover tightly covers the opening and defines a through hole. The input device includes a resistor, a wire, a non-conductive rotating plate, and a conducting member. The resistor and the wire both are discontinuous ring-shaped, and concentrically disposed on the rear cover surrounding the through hole. The rotating plate is rotatably inserted through the through hole. The conducting member is disposed on the rotating plate and connects the resistor and the wire. The conducting member is operable to move around the resistor and the wire such that a resistance between one end of the resistor and one end of the wire is changed.

8 Claims, 6 Drawing Sheets

ELECTRONIC DEVICE HAVING IMPROVED INPUT DEVICE

BACKGROUND

1. Technical Field

The present disclosure relates to electronic devices and, particularly, to an electronic device having an improved input device.

2. Description of Related Art

To control a cursor on a display of electronic devices, navigation keys are employed. Typically, four navigation keys allow for up-down and left-right directions of the cursor. However, when playing games such as a racing game, the navigation keys are not convenient as controls for the movements of the objects in the game.

Therefore, it is desirable to provide an electronic device having an improved input device which can overcome the above-mentioned problems.

DETAILED DESCRIPTION

Embodiments of the disclosure will now be described in detail with reference to the drawings.

Figure 1:
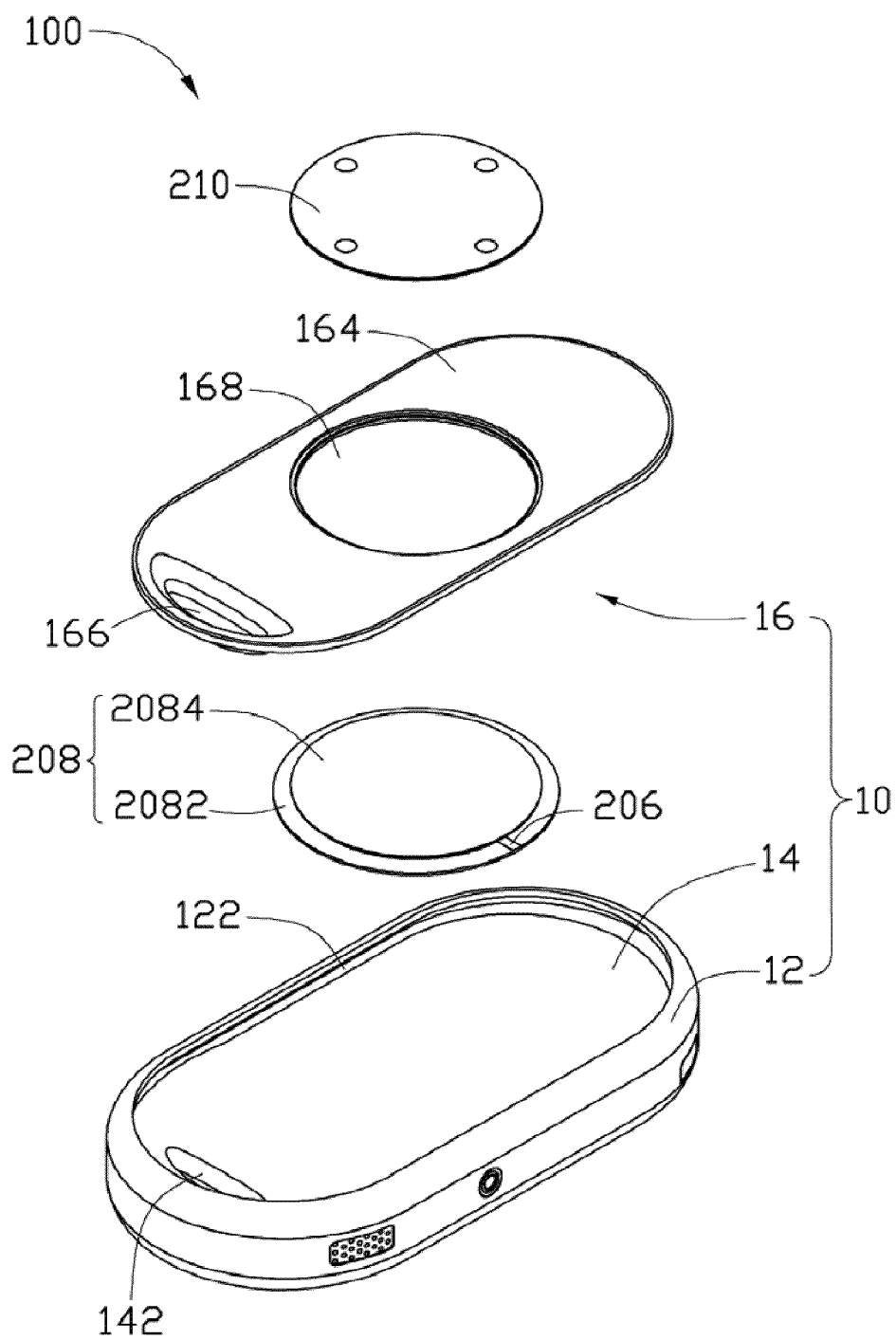
FIG. 1 is an exploded, isometric, schematic view of an electronic device, according to an exemplary embodiment.
Figure 2:
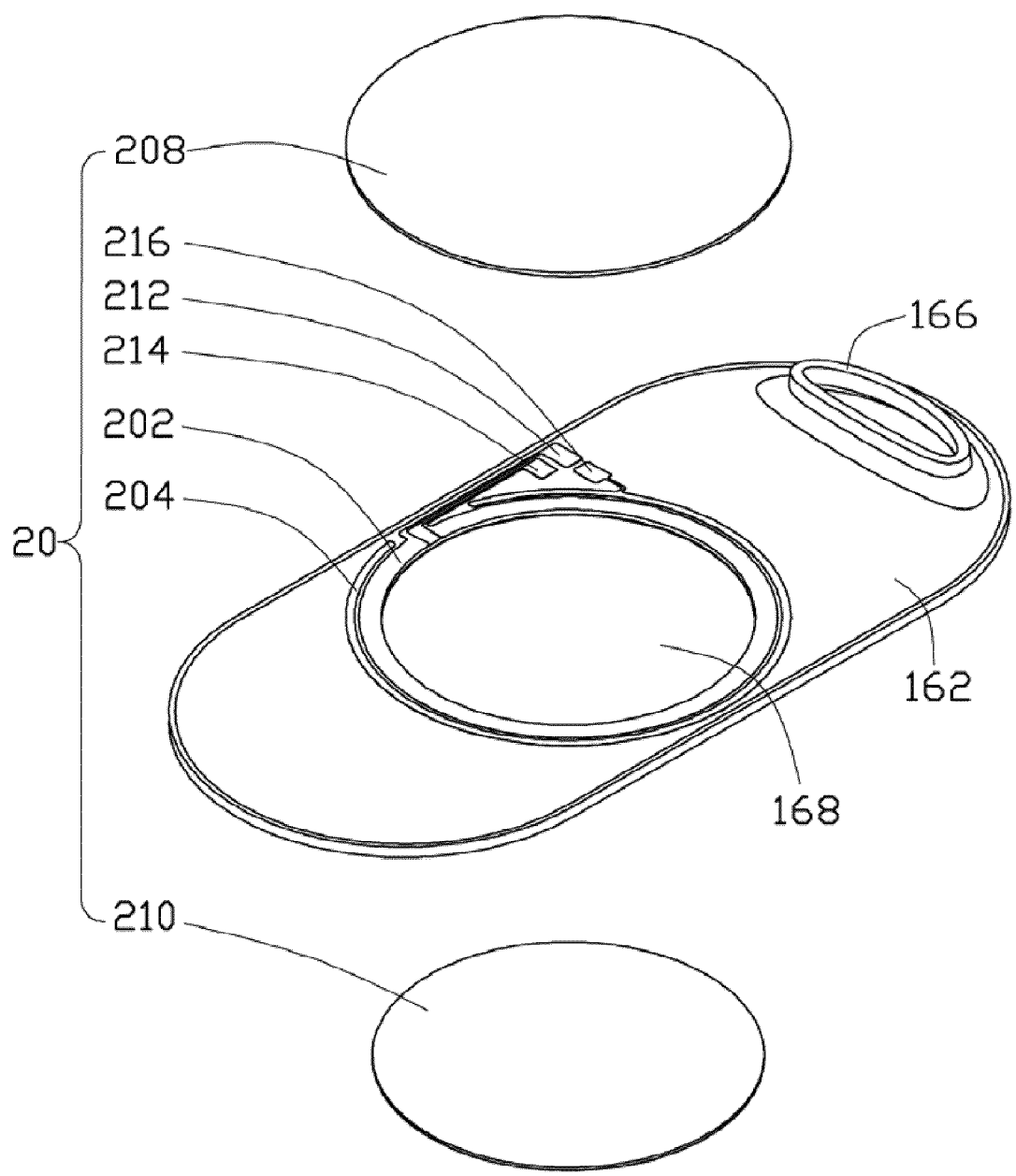
FIG. 2 is a partially exploded, isometric, schematic view of the electronic device of FIG. 1 from another angle.

Referring to FIGS. 1-2, an electronic device 100, according to an exemplary embodiment, includes a body 10 and an input device 20. In this embodiment, the electronic device 100 is a mobile phone, although any other electronic device such as a game player is equally applicable while remaining well within the scope of the disclosure.

The body 10 includes a shell 12, a main board 14, and a rear cover 16. The shell 12 is substantially an elliptical tube in shape, and defines an elliptical opening 122. The main board 14 is a printed circuit board (PCB) received in the shell 12, and defines a substantially half-elliptical locking slot 142. The rear cover 16 has a similar shape to the opening 122, but is a little smaller than the opening 122. The rear cover 16 is electrically non-conductive, and includes an upper surface 162, a bottom surface 164 opposite to the upper surface 162, and a hook 166. The hook 166 has a similar shape of the locking slot 142, but is a little smaller than the locking slot 142. The rear cover 16 defines a circular through hole 168 in the center.

Figure 3:
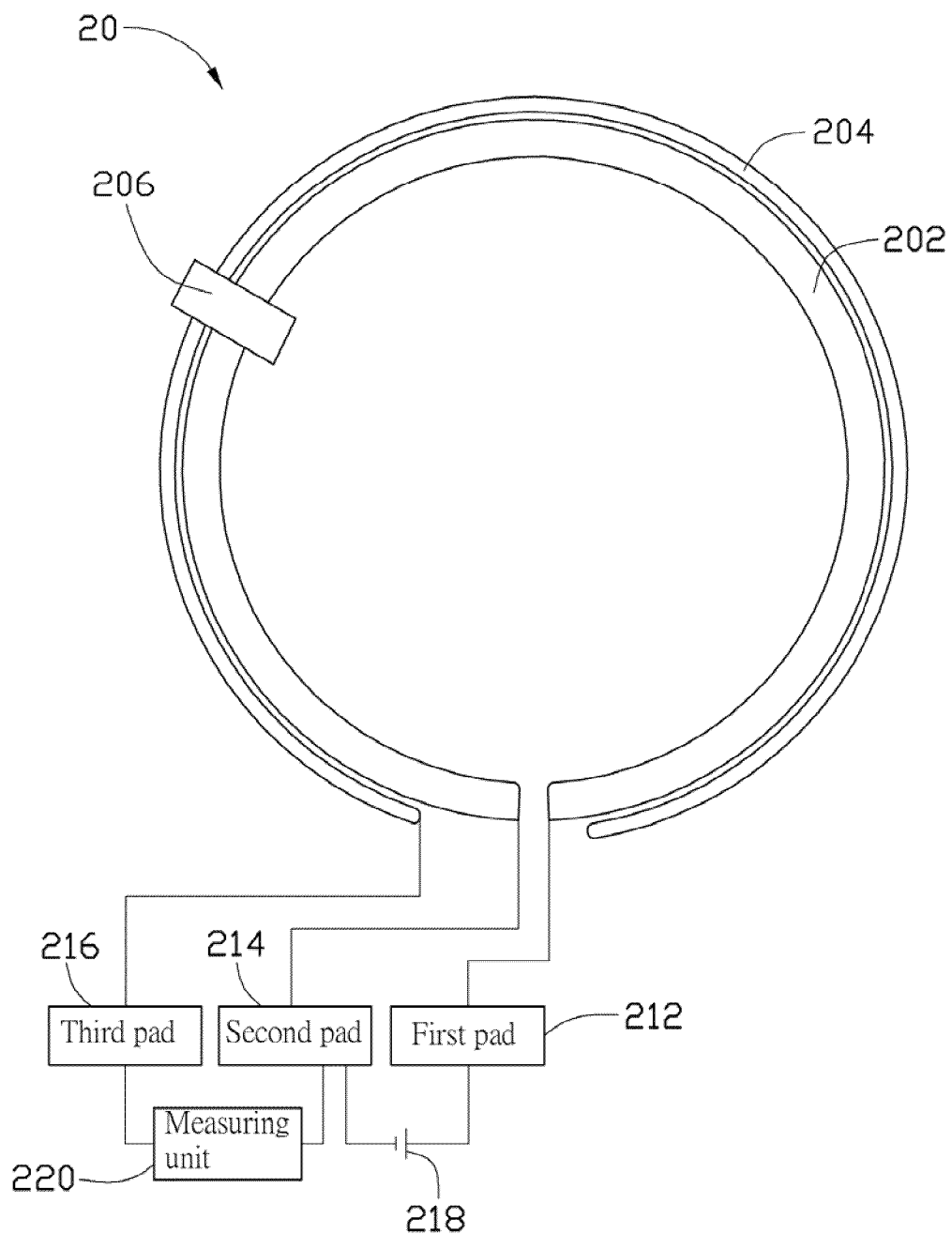
FIG. 3 is a partially schematic view of an input device of the electronic device of FIG. 1.

Also referring to FIG. 3, the input device 20 includes a resistor 202, a wire 204, a conducting member 206, a rotating plate 208, a cushion plate 210, a first pad 212, a second pad 214, a third pad 216, a power source 218, and a measuring unit 220.

The resistor 202 and the wire 204 each is a discontinuous ring in shape. The inner diameter of the resistor 202 is a little greater than that of the through hole 168, and the outer diameter of the resistor 202 is a little smaller than the inner diameter of the wire 204. The resistance of the wire 204 is negligible when compared to that of the resistor 202, while the resistance of the resistor 202 is negligible when compared to that of the measuring unit 220. The conducting member 206 is a rectangular sheet in shape. The width of the conducting member 206 is negligible when compared to that the circumferences of the resistor 202 and the wire 204, and the length of the conducting member 206 is greater than the difference of the outer diameter of the wire 204 and the inner diameter of the resistor 202.

The rotating plate 208 is made of a non-conductive material. The rotating plate 208 includes a circular upper plate 2082 and a circular bottom plate 2084 concentrically disposed on a bottom surface (not labeled) of the upper plate 2082. The diameter of the upper plate 2082 is a little greater than the outer diameter of the wire 204, while the diameter of the bottom plate 2084 is a little smaller than that of the through hole 168. The thickness of the bottom plate 2084 is a little greater than that of the rear cover 16 (i.e., the depth of the through hole 168). The cushion plate 210 is a circular plate made of a material with a high frictional coefficient, such as rubber. The diameter of the cushion plate 210 is a little greater than that of the through hole 168.

In assembly, the resistor 202 and the wire 204 are concentrically disposed on the upper surface 162 and surround the through hole 168. The first, second, and third pads 212, 214, and 216 are disposed on the upper surface 162 and adjacent to the resistor 202 and wire 204. One end of the resistor 202 is connected to the first pad 212, and the other end is connected to the second pad 214. One end of the wire 204 is connected to the third pad 216. The anode of the power source 218 is connected to the first pad 212, and the cathode of the power source 218 is connected to the second pad 214. One end of the measuring unit 220 is connected to the second pad 214, and another end of the measuring unit 220 is connected to the third pad 216. The conducting member 206 is disposed on the bottom surface of the upper plate 2082 adjacent to the bottom plate 2084.

Figure 4:
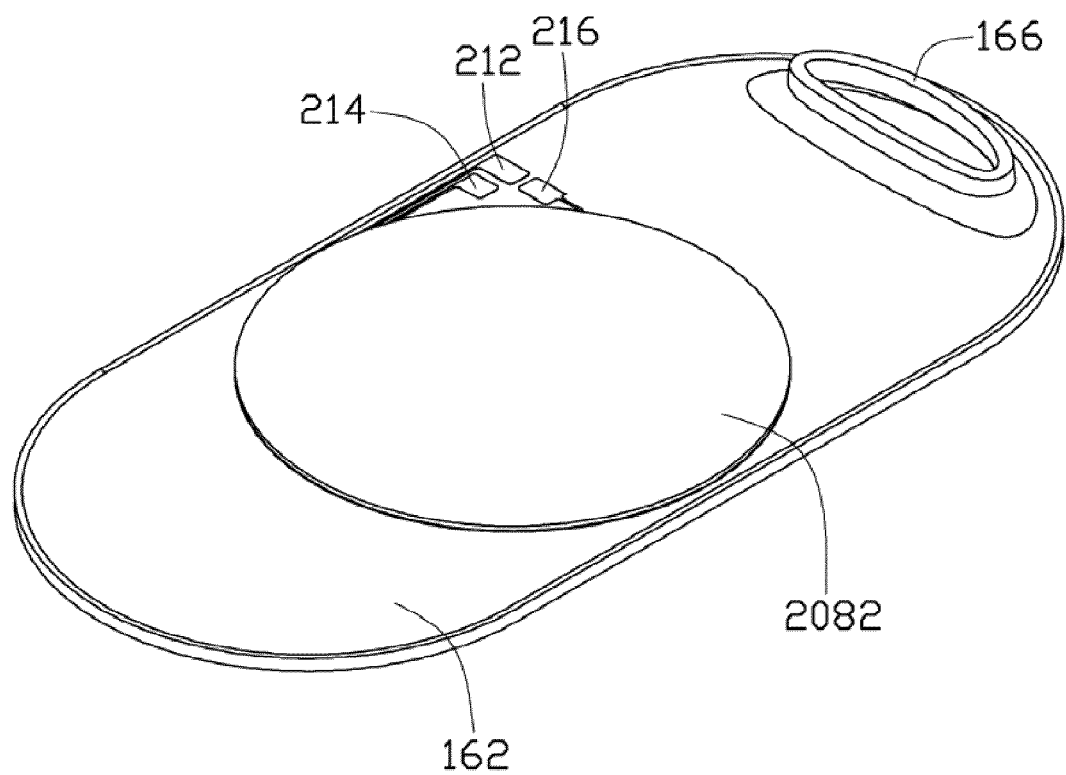
FIG. 4 is a partially assembled, isometric, schematic view of the electronic device of FIG. 1.
Figure 5:
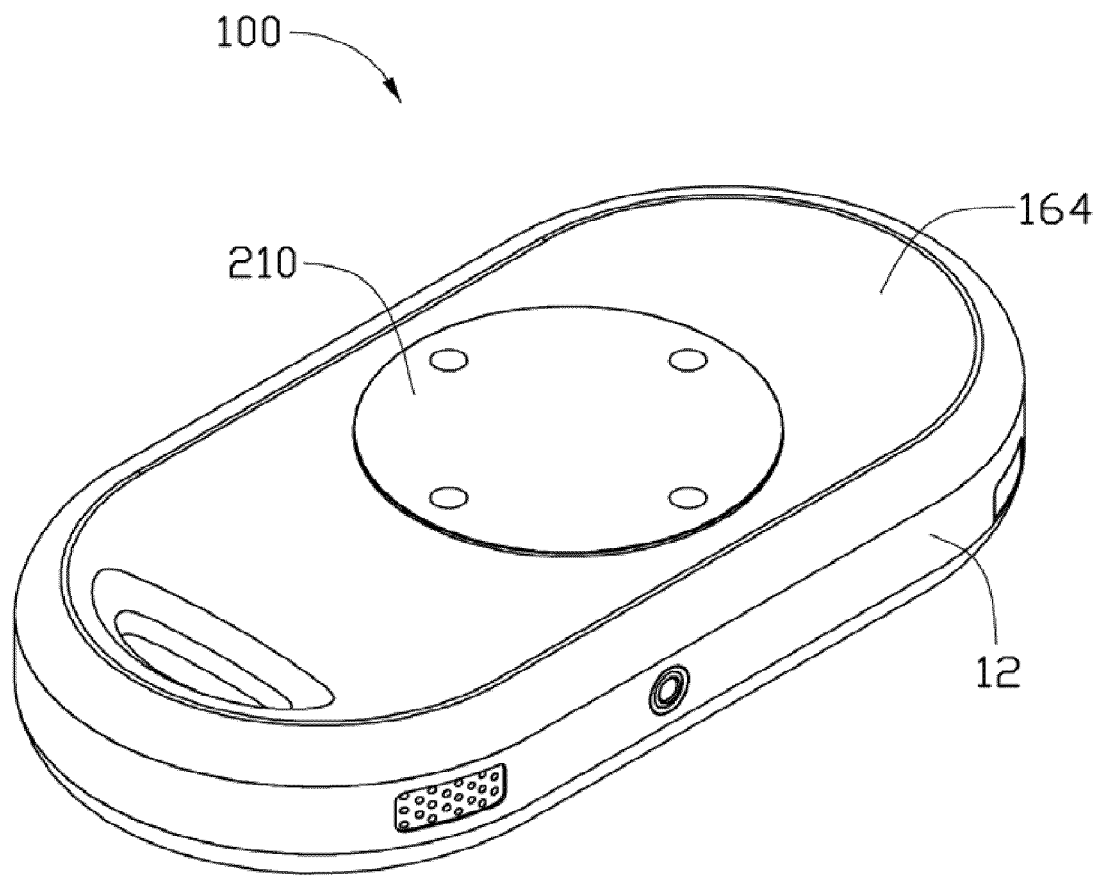
FIG. 5 is an assembled, isometric, schematic view of the electronic device of FIG. 1.

Further referring to FIGS. 4-5, the bottom plate 2084 is inserted through the through hole 168 from the upper surface 162. The upper plate 2082 covers the resistor 202 and the wire 204. The conducting member 206 keeps connecting the resistor 202 and the wire 204. Then, the cushion plate 210 is fixed to the bottom plate 2084, such that the cushion plate 210 and the rotating plate 208 are rotatably connected to the rear cover 16. Finally, the rear cover 16 is engaged with the opening 122 so that the hook 166 hooks into the locking slot 142.

In operation, the electronic device 100 is placed on a platform (not shown). The cushion plate 210 contacts the platform. Then, the body 10 is pressed against the platform and rotated relative to the platform. As a result, the cushion plate 210 and the rotating plate 208 remain still on the platform due to a friction between the cushion plate 210 and the platform. The resistor 202 and the wire 204 rotate relative to the rotating plate 208 with the body 10. Accordingly, the conducting member 206 moves around the resistor 202 and the wire 204. As a result, a voltage between the second pad 214 and the third pad 216 varies according to formula (I):

$$V_X = \frac{R_X}{R_0} V_0, \quad (1)$$

where $V_0$ is an output voltage of the power source 218, $R_0$ is a resistance between two ends of the resistor 202, $R_X$ is a resistance between the second pad 214 and the conducting member 206, $V_X$ is a voltage between the second pad 214 and the third pad 216. The measuring unit 220 measures the variation of $V_X$ which depends on the rotation of the body 10. For instance, if the body 10 rotates clockwise, the resistor 202 and the wire 204 rotate clockwise, and $V_X$ increases. Otherwise, the resistor 202 and the wire 204 rotate counterclockwise and $V_X$ decreases. Then, $V_X$ is inputted to a controller (not shown), and the controller can control the motion of a cursor on a display of the electronic device 100 based upon $V_X$.

It should be understood that the inner diameter of the resistor 202 also can be greater than the outer diameter of the wire 204 to surround the wire 204.

Figure 6:
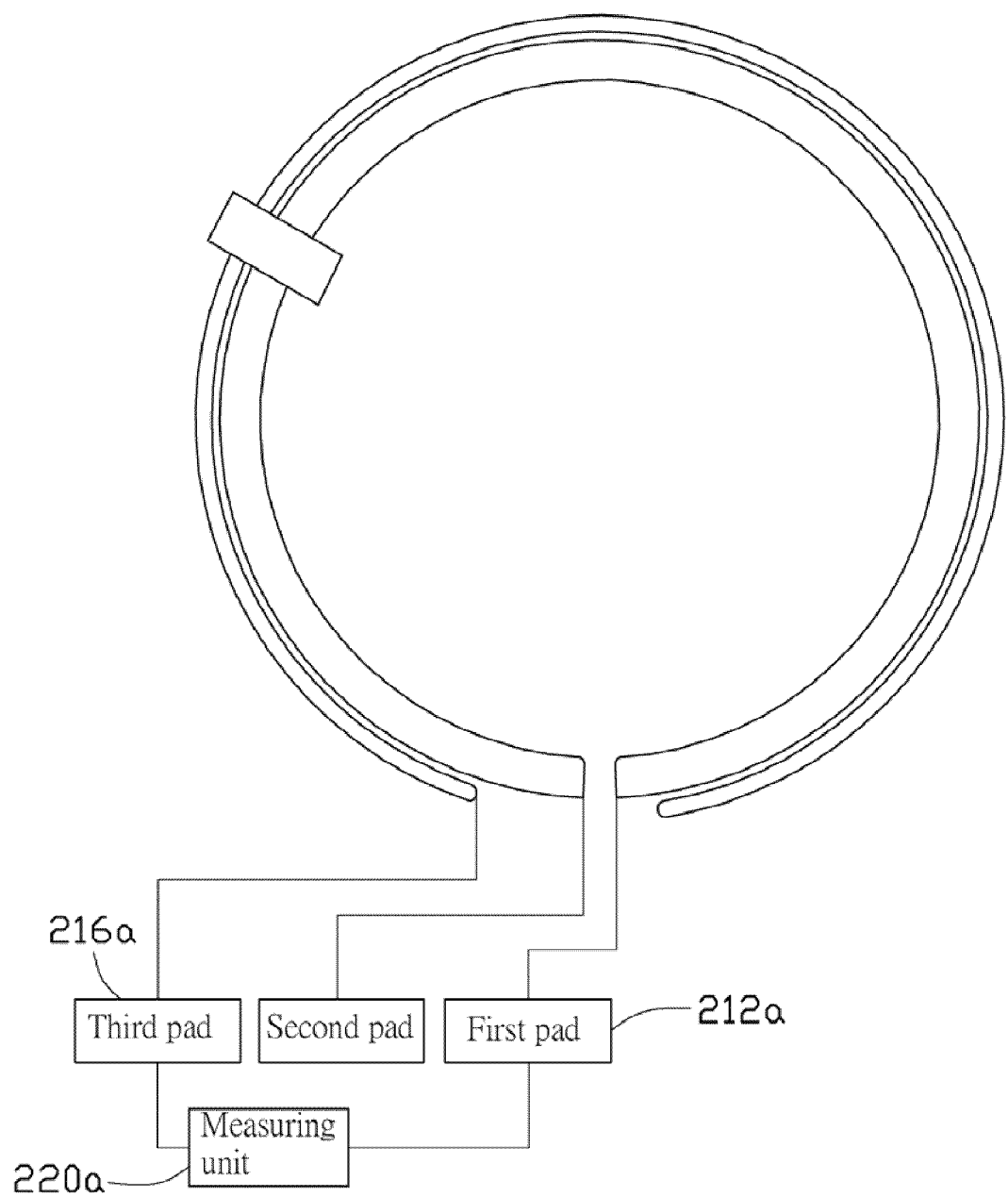
FIG. 6 is a partially schematic view of an input device of an electronic device, according to another exemplary embodiment.

It should be mentioned that the power source 218 can be omitted. For example, in another embodiment shown in FIG. 6, a measuring unit 220a is interconnected between a first pad 212a and a third pad 216a to directly measure a resistance between the first pad 212a and the third pad 216a, and a controller (not shown) can control the motion of a cursor on a display based upon the measured resistance.

It is to be understood, however, that even though numerous characteristics and advantages of the present embodiments have been set forth in the foregoing description, together with details of the structures and functions of the embodiments, the disclosures are illustrative only, and changes may be made in details, especially in matters of arrangement of parts within the principles of the invention to the full extent indicated by the broad general meaning of the terms in which the appended claims are expressed.

What is claimed is:

1. An electronic device comprising:
   a body comprising:
      a shell defining an opening; and
      a non-conductive rear cover tightly covering the opening, the rear cover defining a through hole therein; and
   an input device comprising:
      a discontinuous ring-shaped resistor disposed on the rear cover and surrounding the through hole;
      a discontinuous ring-shaped wire disposed on the rear cover and being concentric with the resistor;
      a non-conductive rotating plate rotatably inserted through the through hole; and
      a conducting member disposed on the rotating plate and interconnecting the resistor and the wire, the conducting member being operable to move around the resistor and the wire such that a resistance between one end of the resistor and one end of the wire is changed.

2. The electronic device as claimed in claim 1, the input device further comprises a power source, two ends of the power source being connected to two ends of the resistor, the power source being operable to provide a voltage between two ends of the resistor.

3. The electronic device as claimed in claim 2, wherein the input device further comprises a measuring unit, one end of the measuring unit being connected to one end of the resistor, and another end of the measuring unit being connected to one end of the wire, the measuring unit being operable to measure a voltage between one end of the resistor and one end of the wire to determine the rotating direction of the body.

4. The electronic device as claimed in claim 1, wherein the input device further comprises a measuring unit, one end of the measuring unit being connected to one end of the resistor, and another end of the measuring unit being connected to one end of the wire, the measuring unit being operable to measure a resistance between one end of the resistor and one end of the wire.

5. The electronic device as claimed in claim 1, wherein the rotating plate comprises an circular upper plate and a circular bottom plate disposed on the upper plate, the diameter of the bottom plate being smaller than that of the upper plate, the bottom plate being inserted through the through hole, the conducting member being disposed on the upper plate adjacent to the bottom plate.

6. The electronic device as claimed in claim 4, wherein the rear cover comprises an upper surface and a bottom surface, the resistor and the wire being disposed on the upper surface, the bottom plate being inserted through the through hole from the upper surface to the bottom surface.

7. The electronic device as claimed in claim 5, wherein the input device further comprises a cushion plate which is connected to the bottom plate.

8. The electronic device as claimed in claim 1, wherein the body further comprises a main board, the main board being received in the shell and defining a locking slot, the rear cover comprising a hook which is inserted into the locking slot.

* * * * *